March 17, 1931. G. O. GRIDLEY 1,796,867
METAL WORKING MACHINE
Filed Jan. 23, 1928 9 Sheets-Sheet 1
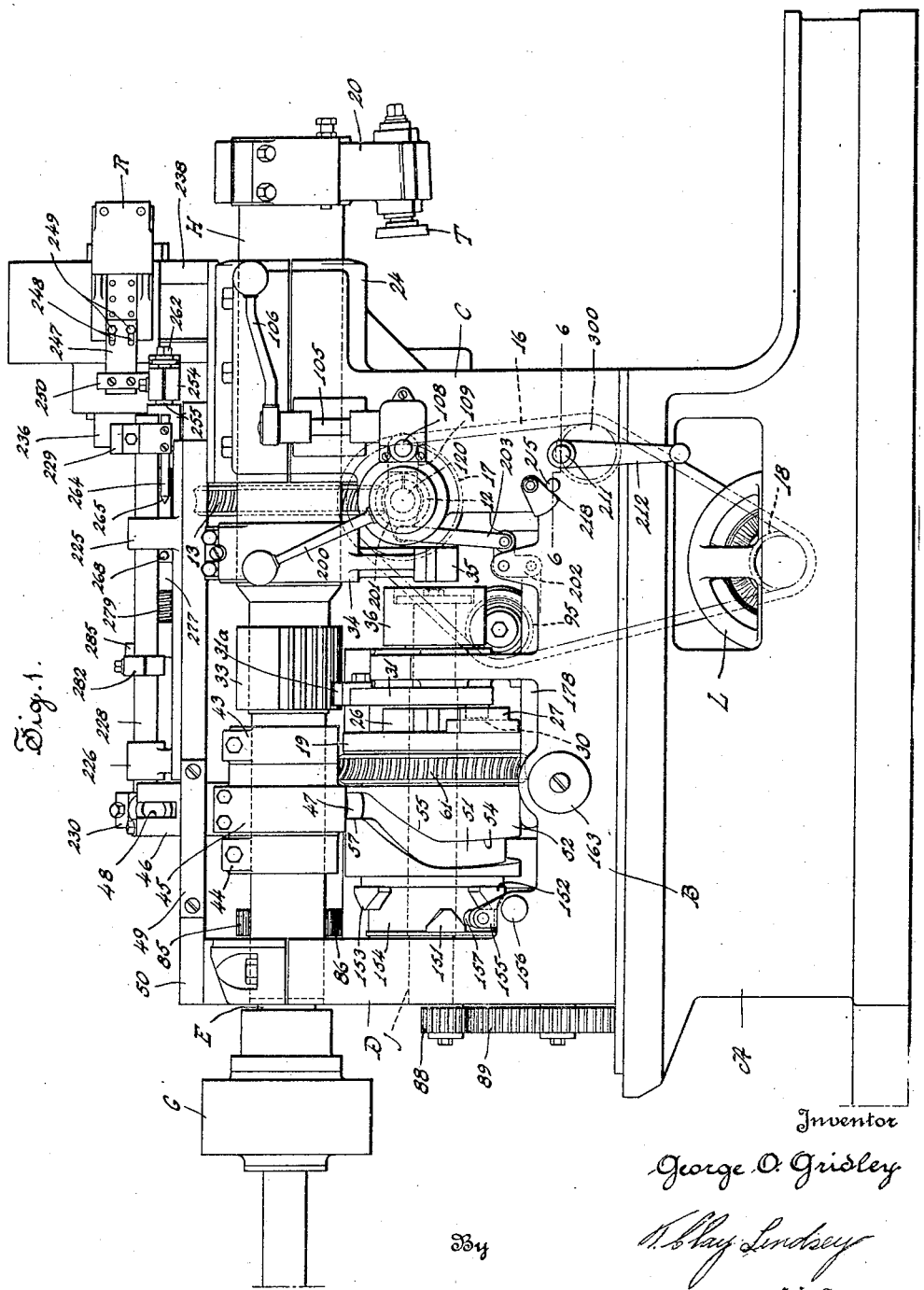
Inventor
George O. Gridley
By R. Clay Lindsey
His Attorney

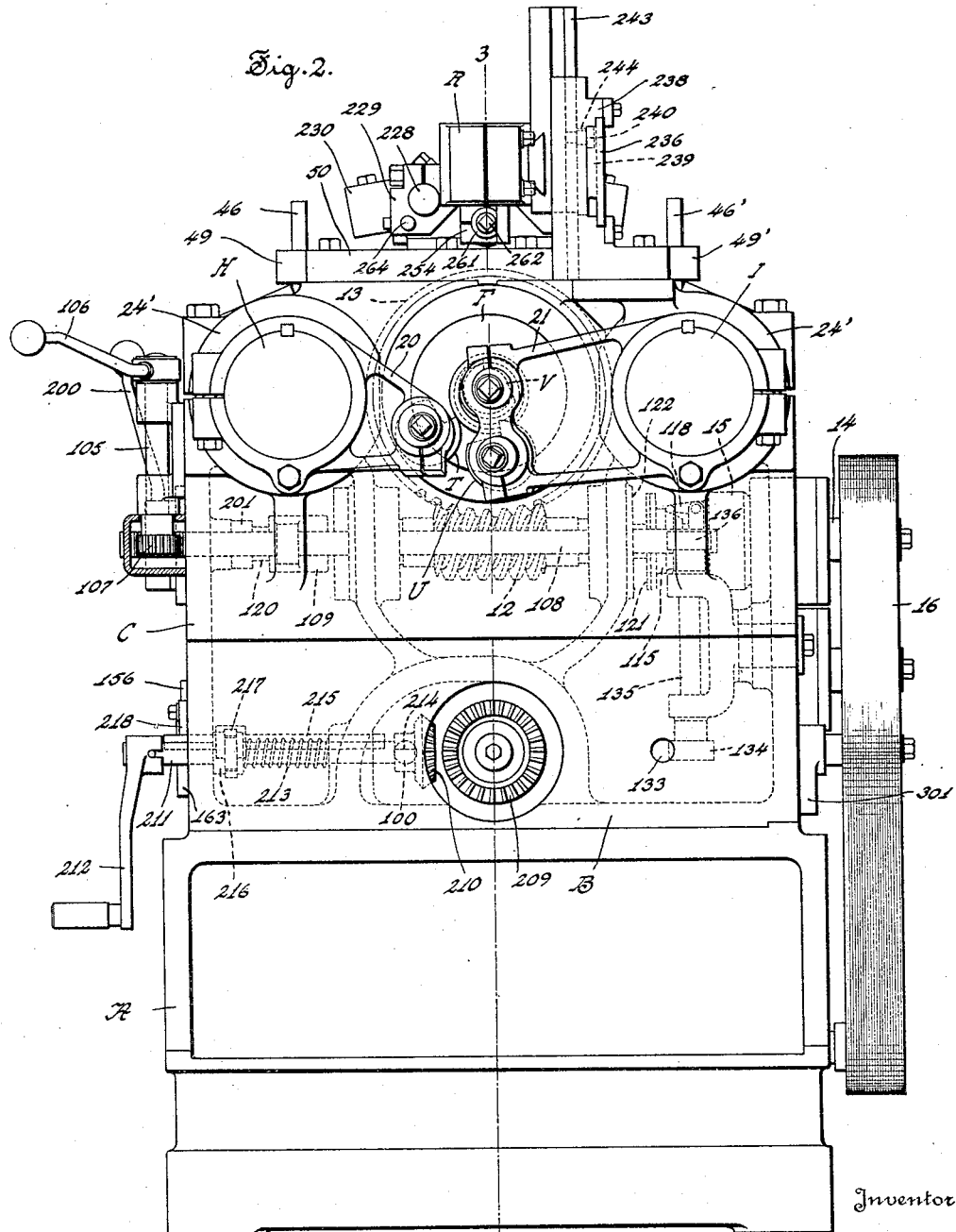

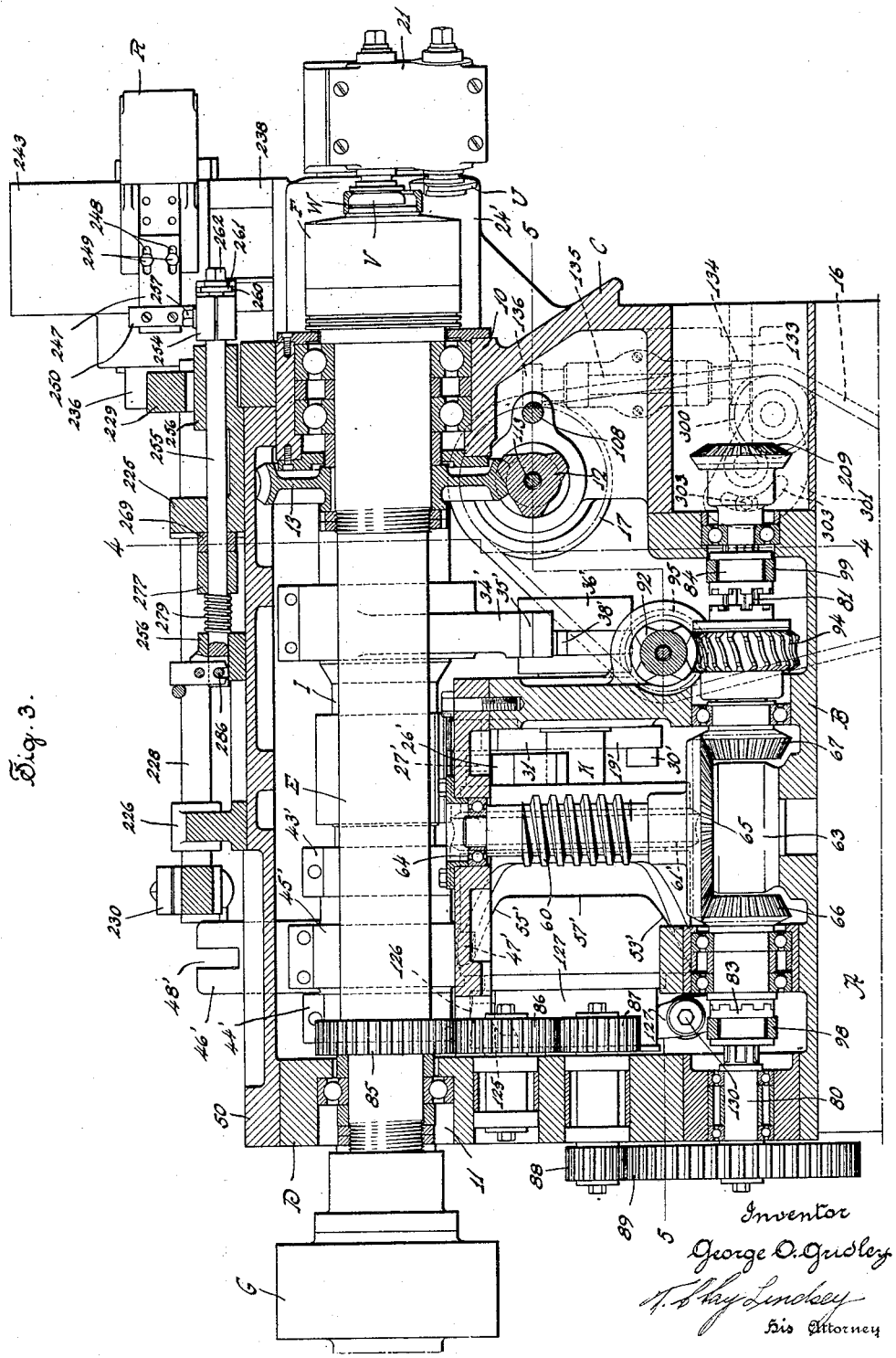

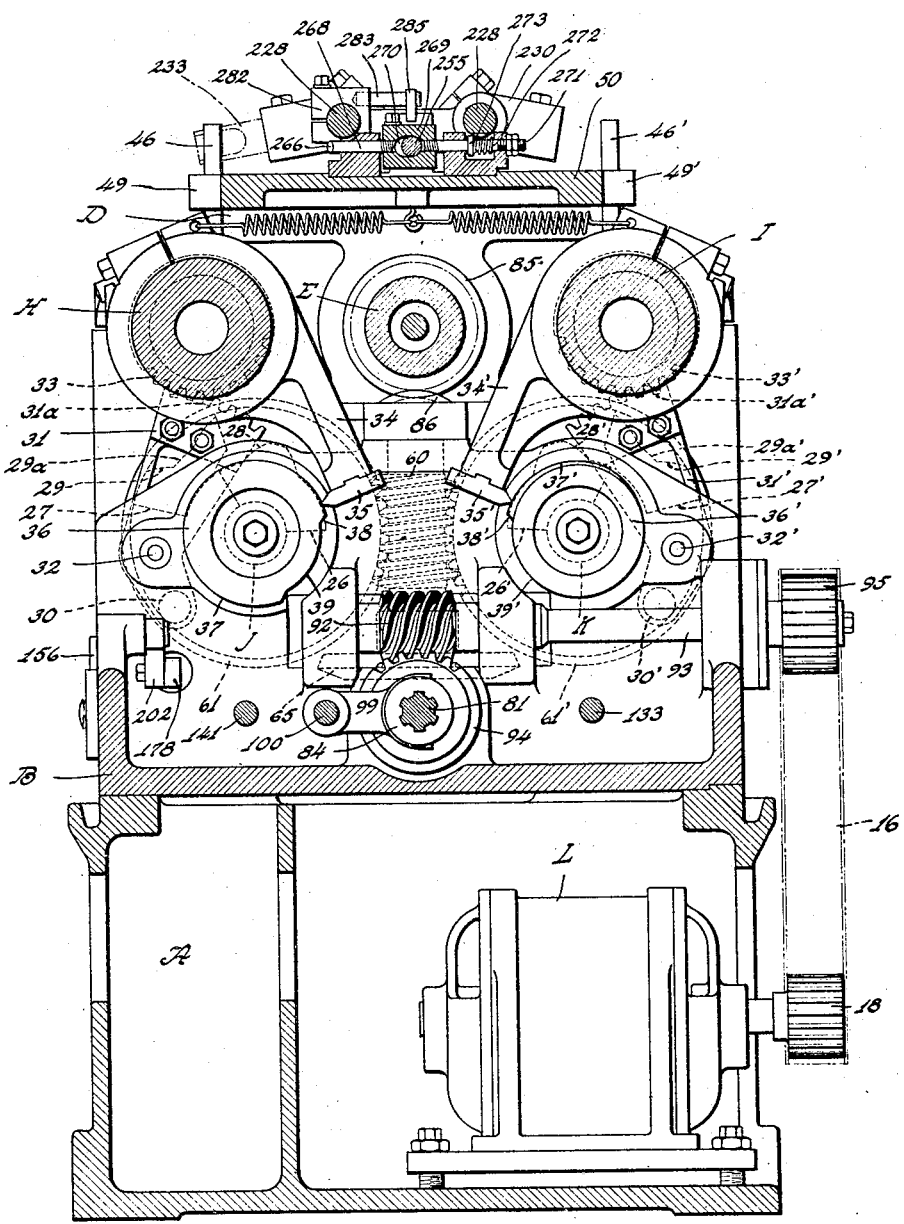

March 17, 1931. G. O. GRIDLEY 1,796,867
METAL WORKING MACHINE
Filed Jan. 23, 1928 9 Sheets-Sheet 5
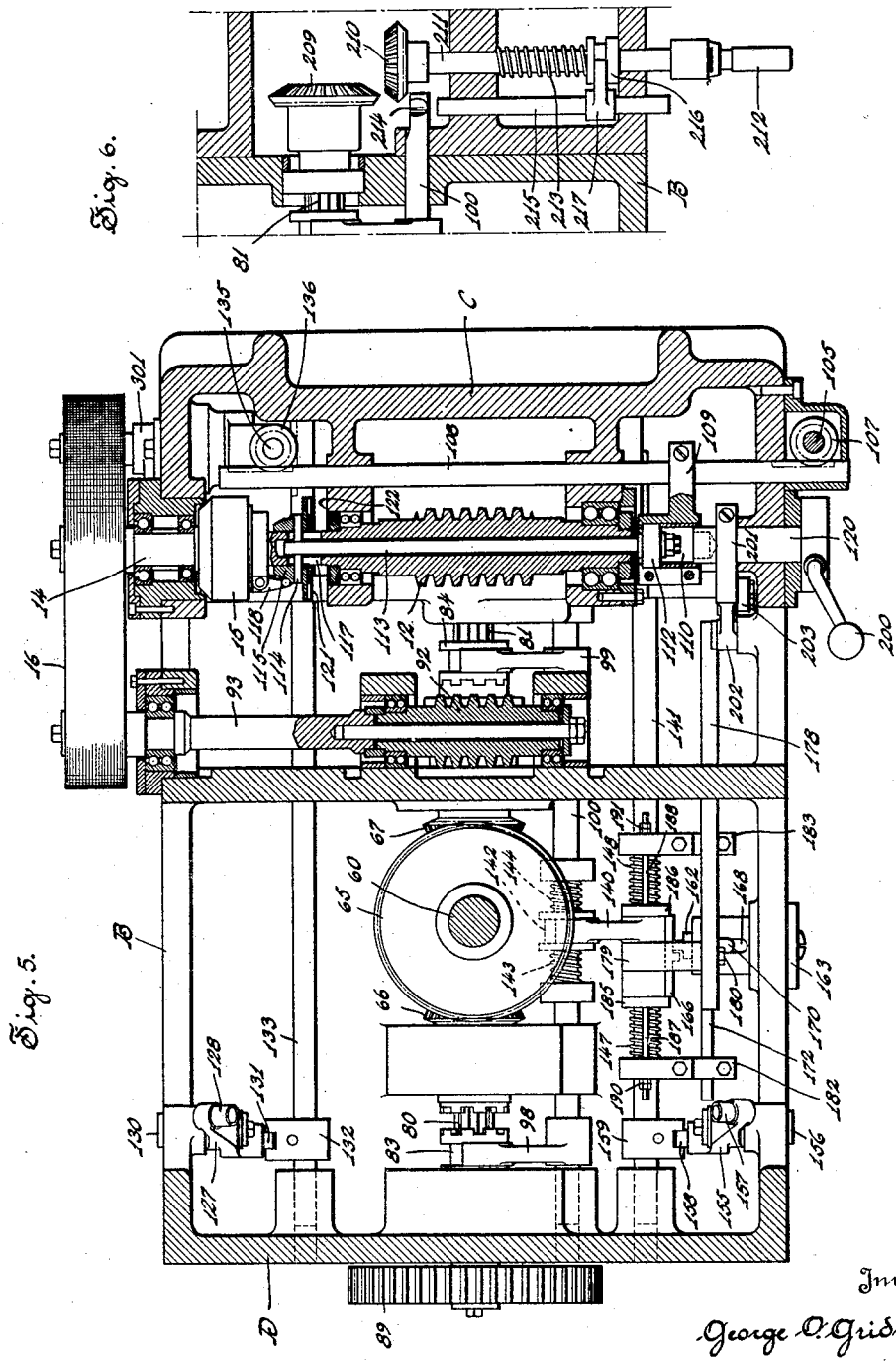
Inventor
George O. Gridley
By
his Attorney March 17, 1931.  G. O. GRIDLEY  1,796,867
METAL WORKING MACHINE
Filed Jan. 23, 1928  9 Sheets-Sheet 6
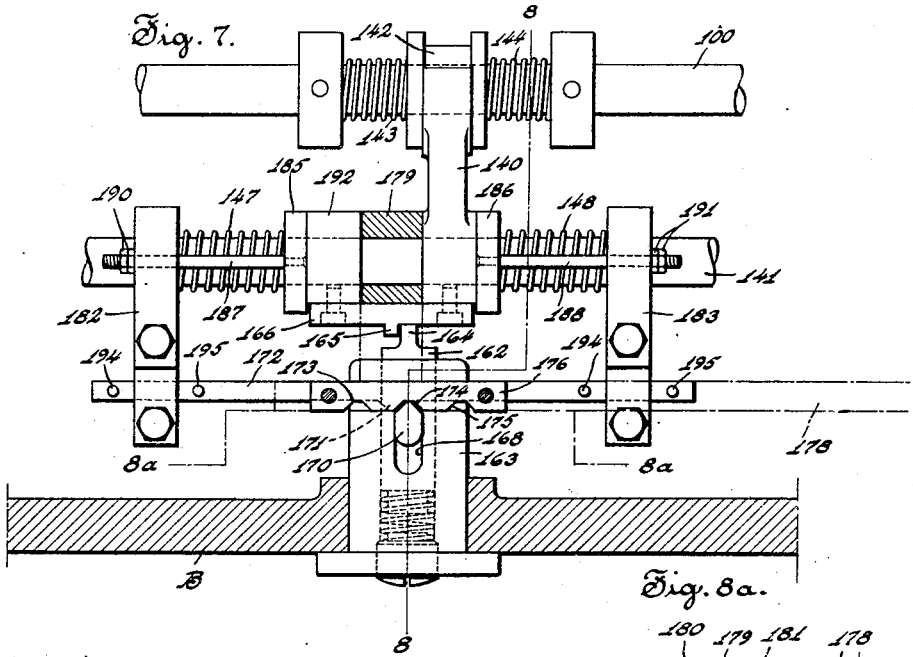
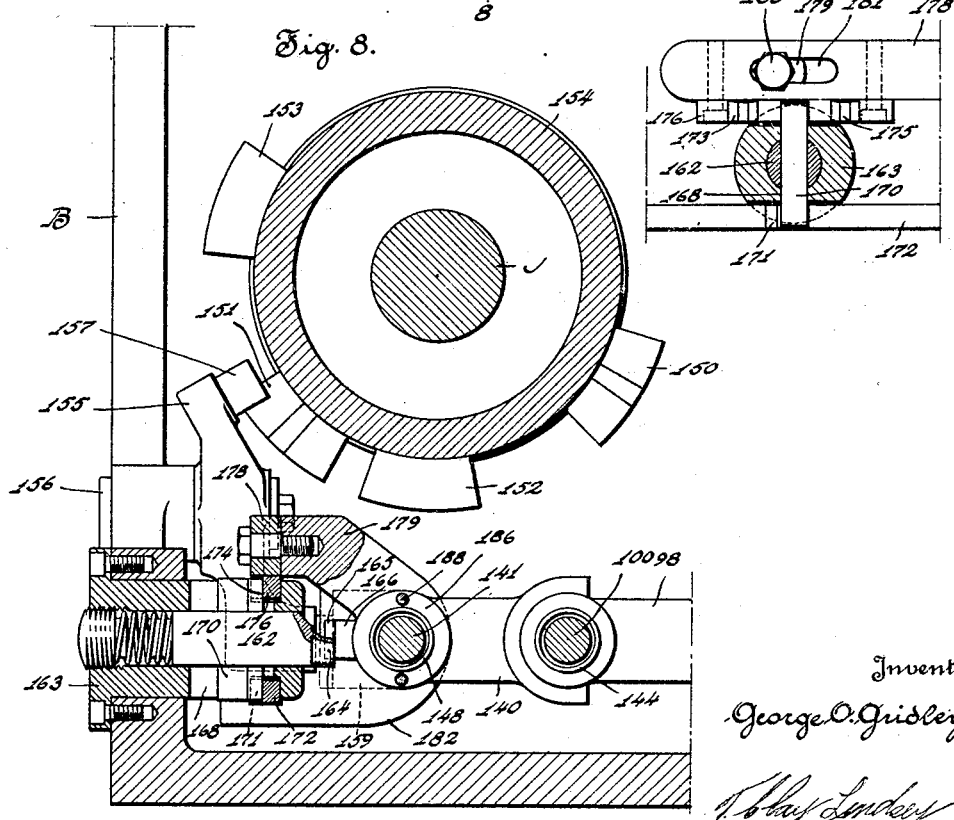
Inventor
George O. Gridley
His Attorney

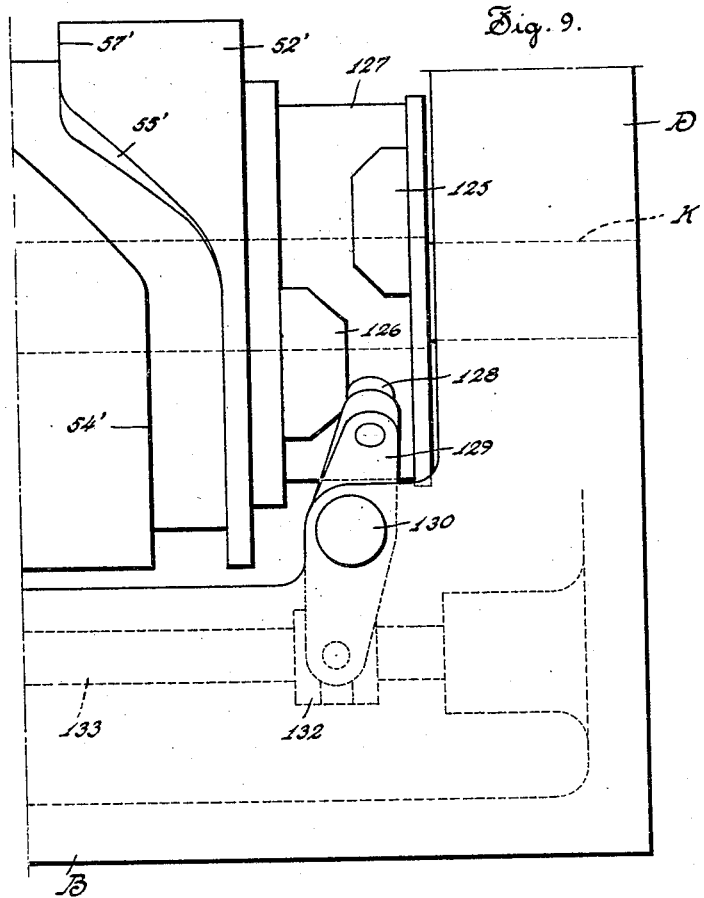
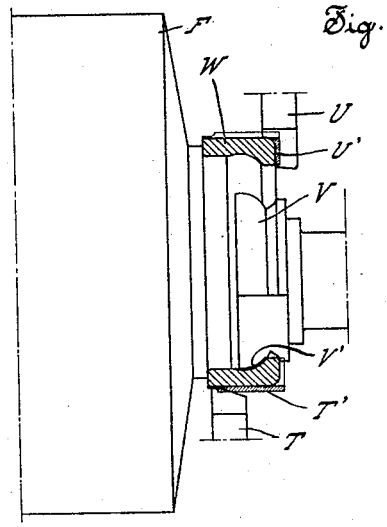

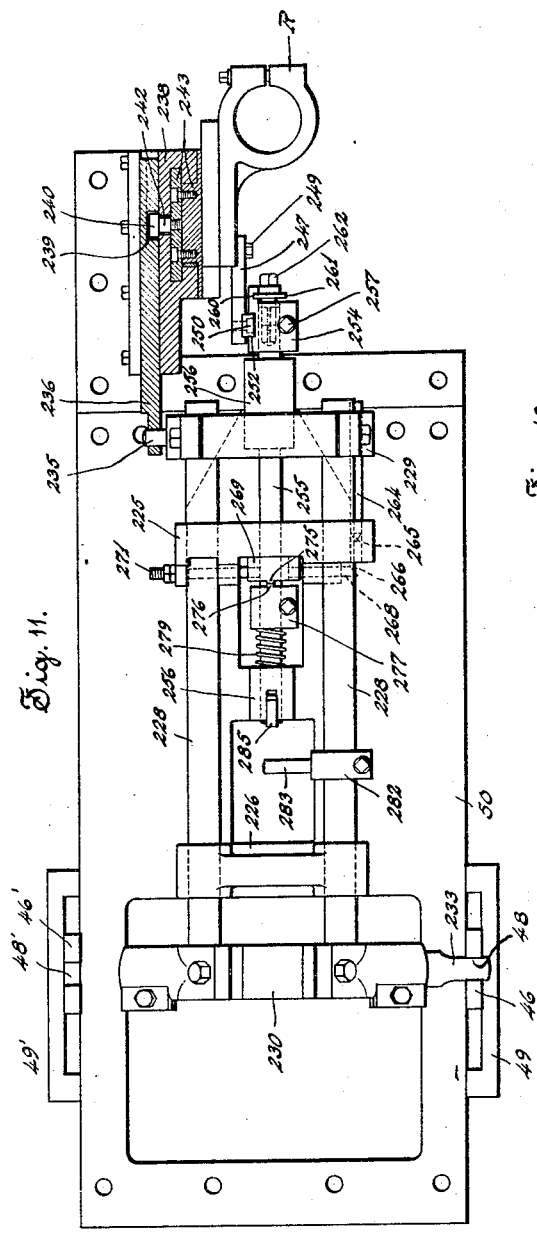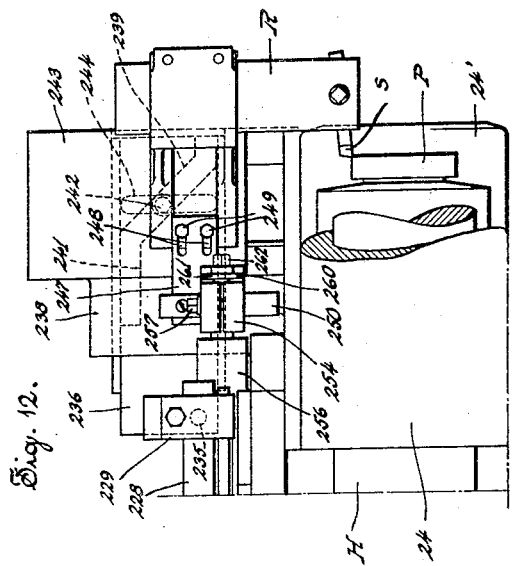

March 17, 1931.  G. O. GRIDLEY  1,796,867
METAL WORKING MACHINE
Filed Jan. 23, 1928   9 Sheets—Sheet 9
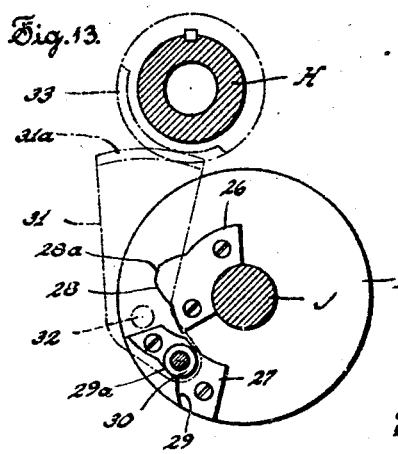
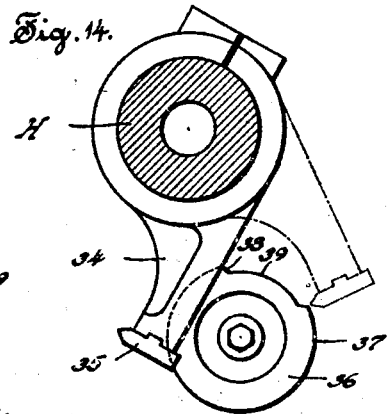
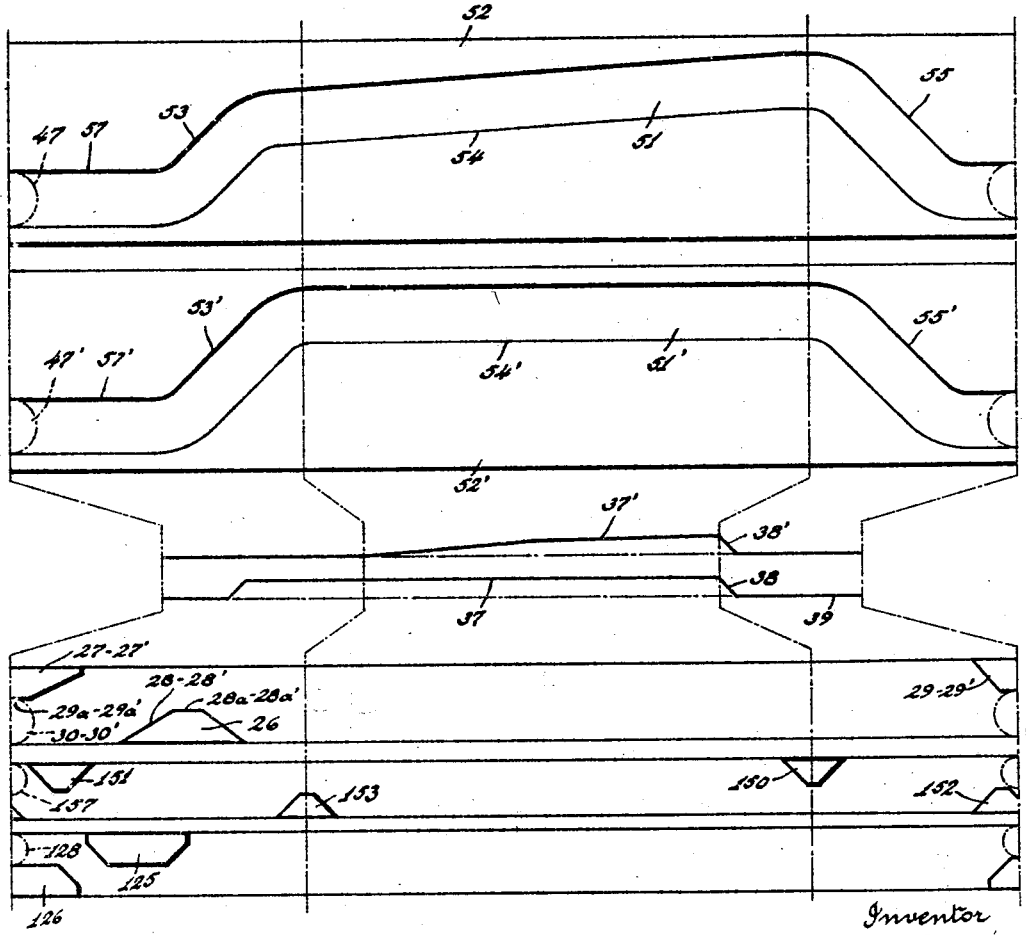
Inventor
George O. Gridley
By N. Clay Lindsey
His Attorney Patented Mar. 17, 1931

1,796,867

UNITED STATES PATENT OFFICE

GEORGE O. GRIDLEY, OF BERLIN, CONNECTICUT, ASSIGNOR TO THE NEW BRITAIN-GRIDLEY MACHINE COMPANY, OF NEW BRITAIN, CONNECTICUT, A CORPORATION OF CONNECTICUT

METAL-WORKING MACHINE

Application filed January 23, 1928. Serial No. 248,941.

This invention relates to metal working machines, and has as its object to provide a machine of the character described having various features of novelty and advantage.

More particularly, an aim of the invention is to provide an improved and simplified machine by means of which a multiplicity of operations may be expeditiously and economically performed with accuracy and at a high rate of production.

My improved arrangement is such that the various functions of the machine are carried out with extreme smoothness and lack of vibrations or other disturbing factors so that work of high precision is accomplished.

While the machine which comprises the subject matter of the present invention is susceptible of various uses, it is especially adaptable for turning ball race cups preparatory to hardening and grinding. It has been the general practice to turn the various circular surfaces of these ball race cups in separate chucking operations which often result in these surfaces being eccentric. In order to overcome these inaccuracies, it has been necessary to leave a relatively large amount of stock for grinding, thereby prolonging the grinding operation. It is an object of the invention to provide a machine which will produce work pieces, the various circular surfaces or portions of which are absolutely concentric, thereby permitting of a relatively small amount of excess stock to be removed by the grinding operation.

Other objects will be in part obvious and in part pointed out more in detail hereinafter.

The invention accordingly consists in the features of construction, combination of elements and arrangement of parts which will be exemplified in the construction hereinafter set forth and the scope of the application of which will be indicated in the appended claims.

In the drawings:

Figure 1 is a view of the left hand side of the machine;

Fig. 2 is a front view of the machine showing the tool arms in cutting position;

Fig. 3 is a vertical central sectional view taken substantially on line 3—3 of Fig. 2;

Fig. 4 is a transverse sectional view taken substantially on line 4—4 of Fig 3;

Fig. 5 is a horizontal sectional view taken substantially on line 5—5 of Fig. 3;

Fig. 6 is a fragmentary view of the mechanism which prevents the application of power to the machine while it is being manually operated, this view being taken substantially on line 6—6 of Fig. 1;

Fig. 7 is a fragmentary view of the automatic speed controlling mechanism;

Fig. 8 is a sectional view taken on line 8—8 of Fig. 7 and also shows the speed control cam 154;

Fig. 8a is a fragmentary sectional view taken substantially on line 8a—8a of Fig. 7;

Fig. 9 is a view of part of the mechanism for controlling the work spindle;

Fig. 10 is a view showing, more or less diagrammatically, the manner in which the tools operate upon a work piece;

Fig. 11 is a top view of the vertical facing mechanism;

Fig. 12 is a fragmentary view of the left front end thereof;

Fig. 13 is a detail view showing the position of the cam 19 when the machine is stopped;

Fig. 14 is a detail view showing the position of the guide arm and cam 37 when the machine is stopped; and Fig. 15 is a diagrammatic view of the cams.

In order that the detailed description which is to follow may be better understood, a general description of the mechanisms of the machine and the mode of operation will here be given.

The machine comprises, generally, a base A having a main frame or headstock B which carries the entire mechanism of the machine. The headstock B has, at its front and rear ends, upwardly extending walls or supports C and D, respectively, in which is rotatably mounted a work spindle E provided at its front end with a chuck F and at its rear end with a hydraulic chuck operating cylinder G. The chuck F and the cylinder G may be of any suitable or well-known types and, for that reason, they are shown more or less diagrammatically. The machine is provided with two tool carriers mounted on opposite sides of the work spindles. These carriers are provided with tool slides H and I, respectively, which are mounted for oscillating and sliding movements in bearings which are parallel to the work spindle. The sequence of movements of these tool carriers is controlled by suitable cams mounted on cam shafts J and K, respectively. The left hand tool slide H is provided at its forward end with a tool carrying arm 20, and the right hand tool slide I is provided with a corresponding arm 21. The tool carriers are moved in unison except during the actual cutting operation. The arrangement is such that, at the beginning of a cycle of movements, each carrier is rocked so as to move the arm carried thereby quickly and radially towards the work, and then the tool slides are moved rearwardly at a relatively fast rate of speed until the tools have reached cutting positions adjacent the work piece W carried by the chuck. A suitable speed controlling mechanism then comes into play so that the longitudinal and rocking movements (as the case may be) of the tool carriers are automatically reduced to proper cutting speed, this speed controlling mechanism being commanded by suitable means on the cam shaft J. After the left hand tool carrier has been brought to cutting position, this carrier, on which the tool T is mounted, while held against further radial movement, is moved rearwardly by a cam on the cam shaft J at cutting speed so that the tool T in draw-cut fashion cuts away the portion T' which is finely cross sectioned as shown in Fig. 10. After the right hand tool carrier has been brought to cutting position at a relatively fast rate of speed, the tool slide I is rocked while held against longitudinal movement so as to move the tools U and V at cutting speed radially of the work causing them to respectively cut away portions U' and V'. It is understood that, when the tool T is moved longitudinally during the cutting operation, the tools U and V are simultaneously moved radially so that the various cutting operations are performed in unison. When the cutting operations have been completed, both tool slides H and I are rocked a slight degree so as to move the tools away from the work, thus preventing tool marks on the work piece on the return stroke, at which time the automatic speed control is again set into operation to increase the speed of the cam shafts, and the tool slides are simultaneously moved forwardly, then rocked downwardly and outwardly at a relatively fast rate of speed, thereby moving the tools clear of the work piece. The machine is then automatically stopped by suitable means which is commanded by the cam shaft K.

Referring now more specifically to the detailed construction of the machine, the work spindle E (see Fig. 3) extends longitudinally of the headstock B and is journalled in bearings 10 and 11 of the front and rear supports C and D, respectively. The spindle is held against endwise movement by the anti-friction units which comprise the bearing 10. The forwardly projecting end of the work spindle has the chuck F and the rearwardly projecting end is provided with a chuck operating cylinder G. Keyed to the work spindle E, adjacent the bearing 10, and meshing with a worm 12, is a worm wheel 13. The worm 12 is positioned at right angles to the work spindle on the support C and is detachably connected to a stub shaft 14 (see Fig. 5) by means of a clutch 15 which is operable both automatically and manually. The stub or clutch shaft 14 is driven by means of a drive chain 16 which passes about a sprocket 17 on the stub shaft 14 and a sprocket 18 fixed on the shaft of a motor L. The speed of the work spindle is constant, that is to say, it rotates at a given speed for work of a certain grade or character. When it is desired to change the speed of rotation of the work spindle E to suit requirements, it is only necessary to remove the sprocket 17 and replace it with one of the proper size.

Reference will now be had to the tool carriers and the various elements associated with the cams which control the sequence of movements thereof. As the tool carriers and their associated cams are generally similar in construction and operation, the same reference numerals will be employed for indicating corresponding parts, except that the reference numerals of the elements associated with the right hand carrier will be primed. The tool arms 20 and 21 are keyed to the forward projecting ends of the respective tool slides H and I which are respectively supported for rocking and sliding movements at their rear ends in bearings provided in the support D and at their forward ends in bosses 24 and 24' respectively of the front support C. These tool slides are of substantial diameter and are supported for rocking and sliding movements in substantial bearings in order that they may be very strong, rigid and inflexible, which means that during the cutting operation there is no loose movement or vibrations which will affect the accuracy of the operations performed or which will leave any chatter marks on the work. The tools are thus enabled to perform a heavy duty in cutting off relatively thick and substantial chips which would not be possible if there was any chance for the tools to vibrate or chatter. It is permissible to cut the work almost down to its final size leaving only a very little clearance or excess stock to be removed by the final grinding operation.

Associated with each tool carrier is a pair of cams, one of which is for the purpose of rocking the carrier to swing the tool up to and away from operative position, and the other of which controls the radial position or movement of the tool during the cutting operation. After the first cam has swung the carrier to a position where the tool thereon is in operative position, the tool slide is moved longitudinally so as to transfer the control of the carrier from the first cam to the second cam. In the case of the left hand carrier having the tool slide H, this carrier is not moved radially during the cutting operation but is moved longitudinally, whereas, in the case of the right hand carrier having the tool slide I, the carrier is given a radial feeding movement while held against longitudinal movement.

Referring now more specifically to the left hand tool carrier, the numeral 19 designates the first cam for swinging the carrier to move the tool into and out of operative poistion, and the numeral 36 is the second cam which determines the radial position of the tool T with respect to the work during the cutting operation. Both of these cams are fixed to the left hand cam shaft J. The cam 19 has a pair of cam elements 26 and 27. The cam element 26 has a surface or portion 28 for rocking the left hand carrier to bring the tool thereon to operative position. This element also has a dwell portion 28a which is effective during the transfer of the control of the carrier from the cam 19 to the cam 36. The cam element 27 has a portion or surface 29 which insures the proper swinging return of the tool carrier after the cutting operation has been completed. The element 27 also has a dwell portion 29a which holds the carrier in swung down position. The cam 36 has a concentric portion 37 which is effective to hold the carrier in proper radial position with respect to the work during the cutting operation, a low concentric portion 39, and a surface 38 which serves to permit the tool to move slightly away from the work after the cutting operation has been completed. The cam 19 effects swinging movement of the carrier through a lever 31 pivoted as at 32 and provided with a gear segment 31a which meshes with a gear segment 33 fixed to the tool slide H. On the lower end of this lever 31, and in the path of movement of the cam elements 26 and 27, is a roller 30. Fixed to the tool slide H is a guide arm 34 having, on its lower end, a follower 35 which is adapted to ride upon the periphery of a cam 36.

The mechanism for reciprocating the left hand tool carrier will now be described. Mounted on the tool slide H against axial movement relative thereto between collars 43 and 44 and permitting of free rotation of the tool slide therein is a sleeve 45. Provided at substantially diametrically opposite points is a keeper 46 and a cam roller or follower 47. The keeper 46 is secured to the sleeve 45 and projects upwardly through, and is mounted for longitudinal sliding movement in, a slot provided by a guide plate 49 fixed to the platform or superstructure 50 so that the sleeve is held against rotation. This keeper is provided at its upper end with a bifurcation 48, the object of which will be hereinafter described more in detail. The cam roller 47 engages in a cam groove 51 of a longitudinal feed cam 52 fixed to the cam shaft J. The cam groove 51 has an inclined portion 53 for moving the tool slide H axially in a rearward direction to bring the tool T into cutting position. Then follows a portion 54 for longitudinally feeding the tool T during the cutting operation, and a return portion 55 for moving the carrier forwardly after the cutting operation has been completed. The cam groove 51 finally has a dwell portion 57 which holds the tool in full forward position.

The manner in which the cams 19, 36 and 52 control the movement of the left hand tool carrier will now be briefly described. Fig. 1 shows the position of the left hand carrier and its associated parts when the machine is in inoperative condition, that is, when the machine has been stopped. In this condition of the machine, the tools are sufficiently spaced from the chuck to permit of engaging a piece of work on the chuck. The roller 30 of the segment lever 31 engages the dwell portion 29a of the cam element 27, as shown in Fig. 13, and the guide arm 34 is forwardly of the cam 36, as shown in Figs. 1 and 14. Power being thrown onto the machine, the cam shaft J and the cams thereon are rotated at a relatively fast rate of speed, and the first thing that happens is that the cam element 26 engages the roller 30 causing the lever 31 to swing in a direction which will result in the carrier being rotated counterclockwise until the roller is on the dwell portion 28a of the cam element 26 at which time the guide arm 34 is in the dotted line position shown in Fig. 14. The cam portion 53 of the cam 52 will now slide the tool slide H rearwardly, thereby bringing the raised guide arm 34 in registry with the cam 36. Upon continued rotation of the cam 19, the roller 30 will ride off of the cam element 26 so that the follower 35 of the arm 34 will engage the concentric portion 37 of the cam 36. The tool T is now in proper position with respect to the outside diameter of the work W in order to take a cut. Through suitable automatic speed controlling mechanism, which will be hereinafter described, the machine is now slowed down to a cutting speed, and the cam portion 54 of the cam 52 will move the tool carrier rearwardly on its cutting stroke, the cam 36 in the meantime holding the tool at a constant radial distance from the axis of the chuck so that the tool T will take from the outside diameter of the work a cut indicated by the finely sectioned portion T', shown in Fig. 10. When the cutting operation has been completed, the follower 35 of the guide arm 34 rides down the portion 38 of the cam 36 and onto the low portion 39 so that the tool is quickly receded a slight distance from the work in order to eliminate unsightly return stroke tool marks which may be difficult to remove in any subsequent grinding operation. The machine, when the tools have finished cutting, is tripped from low to high speed, whereupon the cam portion 55 of the longitudinal feed cam 52 will move the tool carrier forwardly causing the guide arm 34 to ride longitudinally off of the low portion 39 of the cam 36 and, thereafter, the tool carrier will swing on its downward inoperative stroke to the position shown in Figs. 1 and 14. The cam surface 29 of the cam element 27 moves the carrier to its full down inoperative position, and the machine stops when the roller 30 engages the dwell portion 29a and the follower or roller 47 engages in the dwell portion 57 of the longitudinal feed cam 52.

As stated, the operation of the right hand tool carrier is generally similar to that just described in connection with the left hand tool carrier, except that, in the case of the right hand tool carrier, it is not moved longitudinally during the cutting operation but is given a rocking movement to feed the tools U and V radially. The cam 19' is identical to the cam 19, except that it rotates in the opposite direction. The cam 36' has an involute rising portion 37' upon which the follower 35' of the guide arm 34' rides during the cutting operation so as to radially feed the tools into the work. The cam 52' has a dwell portion 54' in which the follower 47' engages during the cutting operation so that the right hand tool carrier is held against axial movement during that period. When the machine is in normal stopped condition, the guide arm 34' has the same relative position to the cam 36' as has the arm 34 to the cam 36.

Upon throwing power onto the machine, the cam shaft K is rotated at the same rapid rate of speed as the cam shaft J, these cam shafts being driven in unison, and the cam element 27' swings the right hand carrier to move the tools thereon into operative radial position with respect to the work. The cam portion 53' of the cam 52' moves the tool slide I axially so as to bring the follower 35' into operative relation to the cam 36', whereupon the automatic speed controlling mechanism slows the machine down to cutting speed. Then, while the dwell portion 54' of the longitudinal feed cam 52' is holding the right hand carrier against axial movement, the cam portion 37' of the radial feed cam 36' feeds the tools U and V into the work so that these tools will simultaneously take the cuts indicated by U' and V', respectively, in Fig. 10. The cutting operation having been completed, the follower 35' will ride down the inclined portion 38' so as to slightly recede the tools from the work and then the cam portion 55' of the longitudinal feed cam 52' will move the tool slide I forwardly, the machine having been tripped to fast speed at the conclusion of the cutting operation. The machine is stopped with the follower 47' engaging in the dwell portion 57' of the cam 52' and with the follower 30' engaging the dwell portion 29a' of the cam element 27'.

It is understood that, since the cam shafts J and K are rotated in unison, corresponding movements of the two tool carriers are simultaneously carried out, with the exception that, during the cutting operation, the tool T is given a longitudinal feeding movement while the tools U and V are given a radial feeding movement.

Reference will now be had to the means for rotating the cam shafts. Referring to Figs. 3 and 4, the cam shafts J and K are mounted for rotation substantially beneath and in parallelism with their respective tool slides H and I and are adapted to be rotated in an outboard direction by a worm 60 meshing with worm wheels 61, 61' fixed forwardly of the cams 52, 52' on the cam shafts J and K, respectively. The worm 60 is mounted in a vertical plane between and at right angles to the cam shafts J and K and is supported at its lower end by a foot bearing 63 and at its upper end in a bearing 64. Fixed to the lower end of the worm 60 is a bevel gear 65 which meshes with bevel gears 66 and 67 adapted to be alternately connected to low and high speed shafts 80 and 81 by means of clutches 83 and 84 splined on the shafts 80, 81, respectively, and which are adapted to be automatically or manually operated by suitable means hereinafter described more in detail. The gear 66 is driven at a relatively slow rate of speed from a gear 85 fixed to the work spindle E through gears 86, 87, 88 and 89, as shown in Fig. 3. The gears 88, 89 are change gears for varying the cutting speed. The high speed shaft 81 is driven by a worm 92 fixed to a shaft 93 and meshes with a worm wheel 94 which is freely rotatable on the shaft 81. The shaft 93 is supported at right angles to the high speed shaft 81 and is provided on its projecting end with a sprocket 95 which meshes with the drive chain 16 (see Figs. 3 and 5).

The clutches 83 and 84 are provided with annular grooves in which engage suitable clutch forks 98 and 99, respectively. The clutch forks are carried by a bar 100 mounted for reciprocating movement in the headstock B and to the left of the high and low speed shafts, as will be most clearly seen from Fig. 5. The clutch 83 connects the bevel gear 66 with the slow speed shaft 80, thus placing the entire machine under control of the work spindle E during the cutting operation, and the gear 67 is connected to the high speed shaft 81 for reciprocating the tool slides H and I up to and away from the work at a relatively fast rate of speed and also during the rocking movements of the tool slides. Thus, it will be seen from the foregoing description that only one of the bevel gears 66, 67 is adapted to rotate the worm 60 so as to drive the cam shafts J and K either at a fast or slow speed at any one time.

The means for manually and automatically controlling the rotation of the work spindle will now be described. In order that the automatic operation of the work spindle control will be more readily understood, it may be stated here that if the work spindle control which includes the lever 127 and control rods 133, 108 was to be operated while the machine is running at high speed, the work spindle only would be stopped as the cam shafts J and K are driven entirely independent of the work spindle at this speed. Therefore, in order to automatically stop the entire machine when the spindle is stopped, the slow speed shaft 80 should be first re-clutched to the work spindle. Referring to Figs. 2 and 5, mounted for rotation on the left hand side of the headstock B is a vertical shaft 105 provided with an operating handle 106 and a gear 107 at its upper and lower ends, respectively. The gear 107 meshes with rack teeth on one end of a control bar 108 mounted for reciprocation in the front end of the headstock B. The control bar carries a connecting block 109 having a bore 110 in one end of which is fixed an anti-friction bearing 112 for rotatably supporting for movement with the control bar 108 one end of a control rod 113. Secured to the opposite end of the control rod 113 by means of a pin 114 and supported for sliding movement on one end of the worm 12 is a spool 115 held against rotation relative to the worm by longitudinal slots 117 through which the pin 114 extends. The spool is adapted to engage the clutch 15 by spreading a plurality of fingers 118 on the clutch, the construction of which forms no part of the present invention. The block 109 is supported by a stub shaft 120 which slidably engages in the bore 110 of the block. When the clutch 15 is disengaged by moving the control rod 113 toward the left hand side of the machine, it is desirable to prevent further rotation of rolling of the work spindle and, to this end, the spool 115 is provided with a flange having a suitable brake lining 121 which, when the clutch is disengaged, is adapted to frictionally engage against the smooth face 122 of the bearing adjacent the spool and which supports the end of the worm 12.

The clutch 15 is automatically controlled by cams 125, 126 secured to a cam drum 127 fixed to the rear end of the cam shaft K (see Fig. 9). The cams 125, 126 cooperate with a roller 128 mounted on the upper end of a cam lever 129 pivoted to the headstock as at 130. The lower end of the lever 129 has a tongue 131 which engages in a slot of a shift block 132 fixed to a reciprocating control bar 133, the forward end of which is provided with rack teeth meshing with a gear 134 fixed to the lower end of a vertical shaft 135 (see Fig. 2), the upper end of which has a gear 136 meshing with rack teeth on the right end of the control bar 108 which is connected to the manual control. The cam 126 moves the control bar 133 forwardly to disengage the clutch 15 so as to stop the entire machine at the conclusion of the cycle, while the cam 125 moves the bar 133 rearwardly to again set the work spindle in rotation after a new work piece has been inserted in the chuck F.

The means for automatically controlling the fast and slow speeds of the cam shafts J and K and their associated tool slides will now be described. As previously stated, the clutch forks 98, 99 are mounted on the reciprocating clutch bar 100. Mounted for reciprocation in the headstock B in parallelism with the clutch bar 100 and connected thereto by a floating link 140 is a shift bar 141. The forked end of the link 140 engages in an annular groove of a sleeve 142 slidably positioned on the clutch bar 100 between springs 143, 144. The opposite end of the link 140 is supported for limited floating movement between springs 147, 148 on the shift bar 141. The sleeve 142 is mounted between the springs 143, 144 in order to allow for the striking of the teeth of the clutches 83, 84 and to complete the shifting as the teeth are matched. The shift bar 141 is moved to and fro to engage either the fast or slow speed clutches by a speed control cam 154 having fast speed cam elements 150, 151 and slow speed cam elements 152, 153. The cam 154 is keyed to the rear end of the cam shaft J (see Figs. 1 and 8). The cam elements 150, 151, 152 and 153 cooperate with a cam lever 155 pivoted to the headstock B as at 156 and provided with a cam roller 157 at its upper end. The cam lever has, at its lower end, a tongue 158 which engages in the slot of a shift block 159 fixed to the shift bar 141.

The link 140 is mounted for floating movement on the shift bar 141 so as to permit the manual engagement of the clutches 83, 84 irrespective of the relative position of the fast and slow speed cams and their associated cam roller 157. The floating movement of the link 140 is controlled by a detent mechanism which includes a spring pressed plunger 162 slidably mounted in a sleeve 163 and having a projection 164 on its forward end which alternately engages with the opposite side faces of a tongue 165 integral with a latch plate 166. Fixed to the spring pressed plunger 162 and extending through an elongated slot 168 in the sleeve 163 for sliding movement therein, is a pin 170, the forward face of which is wedge shaped. The lower end of the pin 170 engages with a lobe 171 of a cam bar 172 slidably supported in thrust blocks 182, 183 fixed to the shift bar 141. The upper end of the pin 170 engages in notches 173, 174, 175 of a cam plate 176 fixed to the rear end of a manual control rod 178. The cam rod bar 172 is provided with upstanding pins 194, 195 to opposite sides of and for engagement with the thrust blocks 182, 183, to disengage the projection 164 of the spring pressed plunger from the tongue 165 of the latch plate 166 so as to permit the springs 147, 148 to shift the clutch bar 100 in either direction to engage either of the clutches 83, 84.

The shifting member or block 179 of the manual control is interposed between the link 140 and a collar 192 tied together by the latch plate 166. Thus, it will be seen that the link 140, block 179, sleeve 192 and latch plate 166 are slid in either direction as a unit on the shift bar 141. The spring 147 is interposed between a thrust collar 185 and the thrust block 182 to which the thrust collar 185 is slidably secured by tie rods 187, and the spring 148 is interposed between a thrust collar 186 and the thrust block 183 to which the thrust collar 186 is slidably secured by tie rods 188. When the clutches are automatically operated, the thrust blocks 182, 183 move with the shift bar 141 and one of the thrust blocks slides on its respective tie rod. When the clutches are manually engaged, the springs 147, 148, thrust blocks 182, 183, thrust collars 185, 186 and the unit which includes the latch plate 166 move with the bar 141. The compression of the springs 147, 148, which are loaded by the thrust blocks 182, 183, respectively, in conjunction with the plunger 162 and the tongue 165 during the automatic operation of the machine, is regulated or equalized by means of nuts 190, 191 threaded on the projecting ends of the tie rods 187, 188, respectively.

Referring to Figs. 5 and 7, the parts are shown in the position that they assume when the high speed clutch 84 is engaged. When the speed of the machine is to be automatically reduced by one of the slow speed cams 152 or 153, the shift bar 141 is moved forwardly or to the right in Fig. 5, and the sliding unit, which includes the latch plate 166, is held stationary by the projection 164 of the spring pressed plunger 162. During the movement of the shift bar 141, the left hand thrust block 182 slides on its respective tie rods 187 to load the spring 147, the pressure of which is exerted on the unit through the thrust collar 185, while the right hand thrust block 183 and the thrust collar 186 move in unison with the shift bar 141 to provide a space between the link 140 of the unit and the thrust collar 186 which is taken up by the unit as the shifting movement is completed. When the spring 147 is sufficiently loaded, the cam bar 172 is moved forwardly with the shift bar 141 by the engagement of the thrust blocks 182, 183 with the pins 194, and the lobe 171 of the cam bar rides against the pin 170 to disengage the spring pressed plunger 162 from the unit, thus permitting the spring 147 to complete the shifting operation. The clearance between the thrust blocks 182, 183 and their associated pins 194, 195 is sufficient to permit the loading of the springs 147, 148 before the plunger 162 releases the cam plate 166.

The clutches 83, 84 are manually shifted to and fro by an operating handle 200 fixed to the enlarged end of the stub shaft 120 (see Figs. 1 and 5). The stub shaft carries a lever 201 which is pivotally connected to a bell crank 202 by a link 203. The manual speed control bar 178 is slidably supported at its rear end by a bolt 180 (see Figs. 8 and 8a) extending through an elongated slot 181 on the end of the control bar 178 so as to permit the bolt to move freely therein irrespective of the control bar 178 when the clutches 83 and 84 are automatically shifted. The bar 178 is pivotally connected at its forward end to the bell crank 202. When the operating handle is moved in a clockwise direction to manually disengage the high speed clutch 84 and engage the low speed clutch 83, the slack between the rear end of the slot 181 and the bolt 180 is taken up and the spring pressed plunger 162 is disengaged from the latch plate 166. As the pin 170 is forced out of the neutral notch 174, the spring pressed plunger 162 releases the latch plate 166 and the unit is shifted in unison with the shift bar 141 without compressing either of the springs 147, 148 until the pin 170 of the spring pressed plunger re-engages in the low speed notch 173 of the cam plate, thus permitting the projection 164 of the plunger to re-engage the tongue 165 of the latch plate on the opposite side.

When it is desired to start the machine, or during the operation of the machine to manually disengage the low speed clutch and engage the high speed clutch 84, the operating handle 200 is thrown counterclockwise, thereby effecting a sequence of operations just the opposite of that described. That is to say, the manual control bar 178 will be moved rearwardly, that is to the left, referring to Fig. 5, the plunger 162 is withdrawn from the position shown in Figs. 5 and 7, and then the bar 178 will move the shifting member 179 which, in turn, will move the shift bar 141 and, through the link 140, the clutch bar 100. When the bar 178 is thus shifted, the pin 170 will be brought into engagement with the high speed notch 175. In the event that, during the manual shifting of the bar 178 to engage either the low speed clutch or the high speed clutch, the shift bar 141 should be held against longitudinal movement, as would be the case where the machine is started, the spring 147 or 148, as the case may be, will permit the manual control bar 178 to move the unit with the link 140 longitudinally of the shift bar. For example, assuming that the machine is standing in normal inoperative position, the cam 152 is opposite the roller 157 so that the shift bar 141 is held at least partially against longitudinal movement. The manual control bar 178 now being moved to the left to start the machine, the unit will be moved to the left on the shift bar 141 so as to engage the high speed clutch 84, which means that the cam shafts are driven. After these shafts are set into rotation, the cam 152 clears the roller 157, and then the spring 147, which has been under compression when the unit has been moved to the left, moves the shift bar 141 to the left, thus moving the cam roller 157 into the path of movement of the next succeeding cam element 153 of the speed control cam 154. It may be stated that the control cam 154 may be provided with an element 151 which is for the purpose of insuring that the shift bar will be moved as just described. It will be observed that, when the fast and slow speed clutches are engaged and disengaged by the manual operation of the operating handle 200, the clutch elements are not snapped into engagement with one another, as this is unnecessary. However, when the clutches are automatically engaged or disengaged through the instrumentality of the control cam 154 moving the shifting bar 141, there is a delayed movement between the bar 141 and the unit having the link 140 so as to load the spring 147 or 148, as the case may be, thereby resulting in a snap engagement of the clutches, as heretofore pointed out more in detail.

For the purpose of turning the machine over by hand, a feature which may be desirable in setting up the machine, for instance, the high speed clutch shaft 81 is provided at its forward end with a bevel gear 209 with which is adapted to mesh a gear 210 fixed to the inner end of a transverse shaft 211, as shown most clearly in Fig. 6. The outer end of this shaft has a handle 212. To engage the gears 209 and 210, the shaft 211 is moved to the right of the machine. The gears are normally held out of mesh by a spring 213. It is desirable to provide means for preventing the power from being thrown onto the cam shafts J and K while turning the machine over by hand and, to this end, there is an interlocking arrangement provided between the clutch bar 100 and the shaft 211. This arrangement includes an opening or notch 214 in the forward end of the clutch bar 100 and a pin 215 fixed to, so as to move longitudinally with, the shaft 211. Fixed to this shaft is a grooved collar 216 in which engages an arm 217 fixed to the pin 215. When the clutch bar 100 is in the neutral position shown in Fig. 6, the notch 214 is in alignment with the pin 215 so that the shaft 211 may be pushed in to engage the gears 209 and 210. When the bar 100 is in other than neutral position, it prevents shifting of the pin 215 and the shaft 211 connected thereto. For the purpose of holding the gears 209, 210 in engagement against the compression of the spring 213, there is provided a latch 218 (see Fig. 1) which is adapted to swing down over the outer or left hand end of the pin 215.

A brief description of the machine so far described will now be given in order that the correlation of the various instrumentalities and mechanisms may be more readily followed. In the normal inoperative position of the machine, that is to say, the condition in which it is automatically stopped after a previous piece of work has been operated upon, the various cam followers have the respective relations to their cams as shown in Fig. 15. In this figure, all of the cams are shown, for convenience, as rotating in the same direction, it being understood that, in the actual machine, they rotate in an outboard direction. Also, in this figure, a single cam is shown for indicating the identical cams 19 and 19′ which are employed for swinging the tools up to and out of operative position. The operating handle 200 is thrown counter-clockwise, whereupon the fast speed clutch 84 is engaged, causing the cam shafts J and K to be rotated through the worm 92, worm wheel 94, shaft 81, bevel gears 67, 65, worm 60 and the worm wheels 61, 61′ on the cam shafts. The cam element 125 on the spindle starting and stopping cam 127 engages the clutch 15 through the control bar 133, vertical shaft 135, control bar 108, block 109 and shift rod 113 so that the spindle is set into rotation. After the spindle has been set into operation, the carriers are rocked by the respective cam surfaces 28, 28′ of the cam elements 26, 26′ on the cams 19, 19′, respectively, so that the tools are brought up into radial operative relation to the work. Then, while the dwell portions 28a, 28a′ of these cam elements are holding the tool arms in their raised positions, the cam portions 53, 53′ of the longitudinal feed cams 52, 52′ move the tool carriers longitudinally so as to bring the raised tools into proper longitudinal cutting position. During this time, the guide arms 34, 34′ are moved over to the respective radial feed cams 36, 36′, thus shifting the control of the radial positions of the tools from the cams 19, 19' to the cams 36, 36', respectively. The cam element 153 of the speed control cam 154 shifts the clutches so that the cam shafts are driven at a slow speed from the work spindle and, about this time, the cam portions 54, 54' of the respective longitudinal feed cams come into play. The feed portion of the cam 52 now moves the tool T on its longitudinal cutting stroke while the cam portion 37 of the feed cam 36 maintains the tool in a fixed radial position. The cam portion 37' of the feed cam 36' feeds the tools U and V radially to effect the cutting operations while the dwell portion 54' of the longitudinal feed cam 52' holds the tools U and V against longitudinal movement. The cutting operations having been completed, the tools are moved quickly a slight distance from the work so as to avoid return tool marks by the cam portions 38, 38' of the radial feed cams. At about this time, the cam element 151 of the speed control cam 154 again trips the machine so as to engage the fast speed clutch and disengage the slow one, whereupon the parts will be brought to their normal inoperative positions. The quick return portions 55, 55' of the longitudinal feed cams move the guide arms 34, 34' from engagement with the respective radial feed cams, and when the cam followers 47, 47' are engaged in the dwell portions 57, 57', the carriers are free to swing to normal inoperative position, that is, to the position shown in Fig. 14. The cam surfaces 29, 29' of the cams 27, 27' cam the carriers down to this normal inoperative position. As these carriers thus swing down, the cam element 152 of the speed control cam 154 again trips the machine from fast to slow speed so as to place the cam shafts J and K under the control of the work spindle E and then the cam element 126 of the spindle starting and stopping cam 127 disengages the clutch 15 so that the spindle will stop rotating and likewise the cam shafts J and K driven therefrom.

In addition to the tool carriers and the tools mounted thereon, which have heretofore been described, the machine may be provided with a tool for effecting a radial cut or vertical facing operation and mechanism for carrying such tool. This supplemental or additional cutting mechanism, in the present illustrative disclosure, is mounted upon the platform 50 and is associated with, so as to be controlled by, either of the tool slides H or I.

Referring more particularly to Figs. 1, 4, 11 and 12, the vertical facing mechanism includes the tool carrying member R and a tool S. Mounted for sliding movement in front and rear bearings 225, 226 on the top of the platform 50 is a slide unit having a pair of parallel bars 228 secured at their front and rear ends, respectively, by tie bars 229, 230. The rear tie bar 230 is provided with laterally extending bosses in either of which is adapted to be secured a stud 233. The projecting end of this stud snugly fits in the notch 48 or 48' of the respective keepers 46, 46', as the case may be. When the stud is engaged in the notch 48, the slide unit having the bars 228 moves longitudinally in unison with the tool slide H. The slide unit may be placed under the control of the tool slide I by securing the stud 233 to the right hand end of the bar 230 and engaging the stud in the notch 48' of the keeper which moves with the slide I. Fixed to the headstock B forwardly of the platform 50 is a support 238 in which is mounted for longitudinal sliding movement a cam plate 236 having a cam groove 239. This cam plate is secured to the tie bar 229 so as to move with the slide unit by a stud 235. Engaging in the cam groove 239 is a roller 240 on a stud 242 screwed into a tool slide 243 mounted for vertical sliding movement in the support or bracket 238. The stud 242 projects through a vertical slot 244 in the bracket 238. The tool carrying member R is carried by the tool slide 243 and has adjustment relative thereto on a longitudinal horizontal line. It will be obvious that, when the tool slide H is moved longitudinally, the slide unit and the cam plate 236 will move therewith and, owing to the cam groove 239, the stud 242 will move vertically in the slot 244, which means that the tool slide 243 and the tool S will be moved radially of the work.

Provision is made for longitudinally adjusting the tool carrying member R on the slide 243 so that the tool S may be set to proper position for operation upon the face to be cut. In Fig. 12, the tool is shown as operating upon the radial face of a piece of work P carried by the chuck F. The plate 247 is adjustably connected to the tool carrying member R by clamping bolts 249 extending through slots 248 in the plate 247. Secured to the rear end of the plate 247 is a vertical guide member 250 which engages in a vertical groove 252 of a supplemental adjusting block 254. The block is adjustably secured to the forward end of a latch bar 255 mounted for limited reciprocating movement in suitable bearings 256 in the platform 50. The block 254 has a groove or notch 260 in which engages a flange 261 of an adjusting screw 262 screwed into the forward end of the latch bar 255, thus providing a micrometer adjustment between the block and the latch bar. The block is secured in adjusted position on the latch bar by a binding screw 257. Thus to adjust the tool with respect to the work, the member R is adjusted to approximate cutting position and is then fixed to the plate 247 by the bolts 249, after which the screw 262 is rotated to adjust the tool to its final cutting position. Then the binding screw 257 is tightened.

Provision is made for quickly withdrawing the tool a slight distance from the work preparatory to moving the tool vertically on its inoperative stroke in order to eliminate tool marks. To this end, there is adjustably secured to the front tie bar 229 a longitudinally extending rod 264 having a conical end 265 which is adapted to wipe against the beveled surface or end 266 of a rod 268. As will be seen most clearly in Figs. 4 and 11, the rod 268 forms part of a latch unit which also includes a slotted block 269 and a rod 271. This latch unit is mounted for sliding movement at right angles to the latch bar in bosses integral with the front bearing 225. The unit is normally held in the latched position shown in Fig. 11 by a spring 272 bearing against a collar 273 on the bar or pin 271 (see Fig. 4). The slot 270 of the block 269 accommodates the latch bar 255. The block 269 has a vertical rib 275 against which is adapted to abut a complementary rib 276 of a sleeve 277 fixed to the latch bar. A spring 279 normally urges the latch bar forwardly. Fixed to the bar 228 of the slide unit is a collar 282 carrying a pin 283 which is adapted, when the slide unit is moved forwardly, to engage a lever 285 pivoted to the rear bearing 256 and having a lower bifurcated end straddling a pin 286 fixed in the rear end of the latch bar 255, as shown most clearly in Figs. 3 and 11.

The operation of the cutting mechanism mounted upon the top of the machine is briefly as follows: When the power is thrown onto the machine, the slide unit and cam plate 236 are moved rearwardly with the tool slide H (or the tool slide I, as the case may be) resulting in bringing the tool into proper longitudinal position with respect to the face which is to be cut. Also, due to the cam slot 239, the tool S is moved downwardly. When the tool S has been brought to approximate cutting position, the machine is tripped, as hereinbefore described, so that it will operate at cutting speed and, thereafter, the tool S is held against longitudinal movement and is fed radialy on its cutting stroke by the cam groove 239. As the tool slides H and 243 approach the ends of their cutting strokes, the conical end 265 of the rod 264 wipes against the beveled end of the rod 268 so as to move the latch block to the right, referring to Fig. 4. This results in disengaging the rib 275 from the rib 276 so that the latch bar is released, whereupon the spring 279 will move the latch bar and the tool carrying member R connected thereto forwardly, thus withdrawing the tool slightly from the work and preventing tool marks upon the return stroke of the tool. The machine is now again tripped so as to operate at a faster sped, as hereinbefore described, whereupon the tool slide H and the tool carrying member are moved quickly on their return strokes. As the slide unit including the bar 228 approaches the end of its forward or inoperative stroke, the pin 283 engages the lever 285, thus moving the latch bar 255 rearwardly so that the rib 276 is withdrawn from the path of movement of the rib 275, thus permitting the block 269 to assume the latching position shown in Fig. 11. When the machine is stopped at the completion of the cycle, the pin 283 remains in engagement with the lever 285. When the machine is again set in motion, the pin 283 is moved from engagement with the lever, thus permitting the spring 279 to again bring the ribs 275, 276 in abutting relation. It will be observed that the cam groove 239 has a dwell portion 241 in which the cam roller 240 is adapted to ride as the tool slides are moved longitudinally up to and away from the work.

From the foregoing description taken in connection with the accompanying drawings, it will be clear that my improved machine has various features of novelty and advantage which result in a simplified and highly efficient construction. The tool slides H and I are supported in the frame rearwardly of the tool arms, that is to say, these slides project forwardly from the frame thus leaving the space about the chuck clear so that the operator may very easily have access thereto for chucking and unchucking the work. The tool slides are of relatively large diameter and are so supported as to permit of such arrangement. The tool carriers are operated and controlled so as to give a nicety of movements which result in work of high precision, thus making the machine particularly adapted for use in accurately cutting the surfaces of ball races. As previously pointed out, the various surfaces of the ball races or ball race cups operated upon are made concentric to one another.

It will be noted that, while there are a number of instrumentalities having various movements, the means for driving and controlling these instrumentalities are relatively simple and compact. It is of particular advantage to drive the drive shafts 14 and 93 from the power or motor shaft by means of the endless chain 16 as, by so doing, a multiplicity of change gears and more or less complicated mechanism is avoided while, at the same time, the rotation speeds at which these shafts are driven may be very easily changed at will. The speed of the spindle and the cutting speeds of the cam shafts may be changed by changing the size of the gear 17 without affecting the speed of rotation of the drive shaft 93 through which the cam shafts are driven at a fast speed, as heretofore described. The slack in the drive chain may be taken up by adjusting an idler 300 carried by a pivoted plate 301 having a slot 302 through which passes a clamping bolt 303.

It is obvious that the cams for controlling the tool carriers may be arranged and set up so as to effect various sequences of movements. The arrangement of the longitudinal feeding cams and the cams for radially moving the carriers may be so constructed that each of the carriers is given corresponding movements. For example, each of the longitudinal feeding cams may be arranged so as to hold the carriers against longitudinal movements during the cutting operation, and each of the cams 36, 36' may be arranged so that both of the tool carriers are rotated slightly during the cutting operation so as to obtain radial cuts on both the internal and external circumferences of the ball race cup or other piece of work operated upon. Also, the longitudinal feeding cams and the cams 36, 36' may be so shaped and timed that the tools on the respective tool arms take longitudinal cuts instead of radial cuts. Furthermore, the various cams may be so arranged that either or both of the carriers are longitudinally moved while they are being slightly rotated, thus effecting a combination of radial and longitudinal movements which will produce either straight or curved tapers on the work.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a machine of the character described, a rotary work spindle, a tool slide mounted in parallelism therewith for longitudinal sliding and rocking movements, a tool arm on said slide, a cam for longitudinally moving said slide, a pair of cams for controlling the rocking movements of said slide, and means on said tool slide for successive cooperation with said cams whereby the rocking movements of said slide are transferred from one of said cams to the other upon and by longitudinal movement of said slide.

2. In a machine of the character described, a work spindle, a tool slide mounted in parallelism therewith for longitudinal sliding and rocking movements, a tool arm on said slide, a cam for rocking said slide to move the tool into and out of approximate radial cutting position, a cam for controlling the angular position of said slide during the cutting operation, an element carried by said tool slide and adapted to successively cooperate with said cams, and a cam for moving said slide longitudinally to thereby transfer the radial control of the slide from one to the other of said mentioned cams and for controlling the longitudinal position of said slide during the cutting operation.

3. In a machine of the character described, a rotary work spindle, a tool slide mounted in parallelism therewith for longitudinal sliding and rocking movements, a tool arm on said slide, a cam shaft, a cam on said shaft for longitudinally moving said slide, a cam on said shaft for rocking said slide to thereby move the tool into and out of approximate radial cutting position, a cam on said shaft for controlling the radial position of said tool during the cutting operation, and a guide arm fixed to said slide and adapted to engage said last mentioned cam during the cutting operation, said arm being moved by said second mentioned cam to a radial position where it may be moved by said first mentioned cam onto the third mentioned cam.

4. In a machine of the character described, a rotary work spindle, a tool slide in parallelism therewith and having longitudinal sliding and rocking movements, a tool arm on said slide, a cam for longitudinally moving said slide, a second cam for rocking said slide to move the tool carried thereby into approximately radial cutting position, a third cam for controlling the radial position of said slide during the cutting operation, a connection between said second mentioned cam and slide which is ineffective when said slide is under the control of the third mentioned cam, and a connection between said third mentioned cam and slide which is ineffective when the slide is under the control of the second mentioned cam.

5. In a machine of the character described, a rotary work spindle, a tool slide mounted in parallelism therewith for longitudinal sliding and rocking movements, a tool arm on said slide, a cam shaft, a cam on said shaft for longitudinally moving said slide, a second cam on said shaft for rocking said slide to move the tool carried thereby into approximate radial cutting position, a third cam on said shaft for controlling the radial position of said slide during the cutting operation, a segmental rack on said slide, a lever having a complementary segmental rack and controlled by said second mentioned cam, and a guide arm fixed to said slide and adapted to engage the periphery of said third mentioned cam during the cutting operation.

6. In a machine of the character described, a work spindle, a tool slide mounted in parallelism therewith for longitudinal sliding and rocking movements, a tool arm on said slide, a cam shaft in parallelism with said slide, a cam thereon for rocking said slide to move the tool into and out of approximate radial cutting position, a cam on said shaft for controlling the angular position of said slide during the cutting operation, a cam on said shaft for moving said slide longitudinally, and a cam on said shaft for controlling the speed of rotation thereof.

7. In a machine of the character described, a rotary work spindle, a tool slide mounted to each side of and in parallelism with said spindle for longitudinal sliding and rocking movements, a tool arm on each slide, a cam shaft associated with each slide, a cam on each shaft for longitudinally moving the associated slide, an element carried by each slide, and a pair of cams on each shaft and with which the respective element is adapted to successively cooperate for controlling the rocking movements of the associated slide, the cams of each of said pairs being relatively positioned longitudinally of the shaft on which they are mounted.

8. In a machine of the character described, a rotary work spindle, a pair of tool slides one to each side of said work spindle, a tool arm on each slide, a pair of cam shafts one for each slide, cams on said shafts for controlling the longitudinal sliding and rocking movements of said slides, a worm wheel on each of said shafts, and a common worm between and meshing with each of said worm wheels for rotating said shafts.

9. In a machine of the character described, a work spindle, a tool slide mounted for reciprocating movements, a cam shaft, cam means on said shaft for controlling said slide, a power shaft, a drive shaft parallel to said power shaft and connected to said work spindle for rotating the same, a drive shaft parallel to said power shaft and last mentioned shaft for driving said cam shaft, and an endless chain through which said power shaft drives said drive shafts.

10. In a machine of the character described, a work spindle, a tool slide mounted in parallelism therewith for reciprocating movements, a cam shaft in parallelism with said tool slide, cam means on said cam shaft for controlling said tool slide, a power shaft, a drive shaft connected to said spindle for driving the same, a drive shaft connected to said cam shaft for driving the same, sprockets on said power shaft and drive shafts, an adjustable sprocket, and an endless chain passing about said sprockets.

11. In a machine of the character described, a frame, a work spindle mounted therein, a tool carrier mounted in said frame for longitudinal sliding and rocking movements, a cam for controlling the rocking movements of said carrier, a cam for controlling the longitudinal movements of said carrier, a radially movable tool slide, a cam plate mounted for longitudinal movement and associated with said tool slide for moving the latter, and a connection between said cam plate and said second mentioned cam whereby said carrier and plate are moved in unison.

12. In a machine of the character described, a frame, a work spindle mounted therein, a tool slide mounted in said frame parallel to said spindle for longitudinal sliding and rocking movements, a cam shaft, cam means on said shaft for controlling the rocking movements of said slide, a cam on said shaft for controlling the longitudinal movements of said slide, a slide unit mounted for longitudinal sliding movement on the top of said frame, a connection between said slide unit and said cam, a vertical tool slide mounted at the top of said frame, and a cam plate connected to said slide unit and associated with said vertical tool slide for moving the latter.

13. In combination, a tool slide mounted for reciprocation, a tool carrier thereon mounted for sliding movement at right angles to the direction of movement of said slide, a slide unit movable at right angles to the direction of movement of said slide, means for moving said slide unit, a cam plate between said slide unit and slide, a latch bar connected to said carrier, and latching means for said bar controlled by the sliding movement of said carrier and arranged to cause said carrier to move on said slide to withdraw the tool from the work after the cutting operation.

14. In combination, a tool slide mounted for reciprocation, a tool carrier mounted thereon for sliding movement at right angles to the line of movement of said slide, a slide unit movable at right angles to the line of movement of said slide, means for reciprocating said slide unit, a cam plate between said slide unit and slide, a reciprocating latch bar to which said carrier is connected, a spring for urging said latch bar and carrier in one direction, a rib carried by said latch bar, a transversely movable latch block having a rib adapted to be engaged by said first rib, a pin carried by said slide unit for moving said latch block to disengage said ribs, and cooperating means between said slide unit and latch bar for engaging said ribs.

15. In combination, clutch mechanism, a shiftable unit through which said mechanism is operated, a bar movable relative to said unit, spring means between said bar and unit and through which said bar shifts said unit, and latch means controlled by the movement of said bar for preventing movement of said unit until said spring means is loaded.

16. In combination, clutch mechanism, a shift bar, means for reciprocating said shift bar, a unit slidably mounted on said shift bar and connected to said clutch mechanism, a spring between said bar and unit through which said bar moves said unit, a latch for preventing said unit from moving with said bar until said spring is loaded, and a cam bar controlled by said shift bar and controlling said latch.

17. In combination, interconnected slow and fast speed clutches, a shiftable unit through which said clutches are operated, a shift bar movable relative to said unit, opposed springs between which said unit is interposed and through which said bar shifts said unit, and latch means controlled by the movement of said shift bar for preventing movement of said unit until one of said springs is loaded.

18. In combination, interconnected slow and fast speed clutches, a shift bar, a shift unit slidably mounted on said bar and connected to said clutches, opposed springs on said bar and between which said unit is positioned, means for shifting said bar, a latch for preventing movement of said unit until one of said springs is loaded, and a cam bar controlled by said shift bar and controlling said latch.

19. In combination, interconnected slow and fast speed clutches, a shift bar, means for shifting said bar, a unit slidably mounted on said bar and connected to said clutches, thrust blocks fixed to said shift bar, springs between said blocks and between which said unit is interposed, thrust collars interposed between the respective ends of said unit and springs, tie rods slidably connecting the thrust collars to the respective thrust blocks, a cam bar slidably carried and operated by said thrust blocks, a latch plunger for latching said unit against movement until one of said springs is loaded, and means between said latch plunger and cam bar for controlling the latch plunger.

20. In combination, clutch mechanism, a shiftable unit through which said mechanism is operated, a bar movable relative to said unit, means for automatically operating said bar, spring means between said bar and unit and through which said bar shifts said unit, latch means controlled by the movement of said bar for preventing movement of said unit until said spring means is loaded, and means for manually moving said unit to operate said clutch mechanism.

21. In combination, clutch mechanism, a shift bar, means for automatically moving said shift bar, a unit slidably mounted on said shift bar and connected to said clutch mechanism, a spring between said bar and unit through which said bar moves said unit, a latch for preventing said unit from moving with said bar until said spring is loaded, a cam bar controlled by said shift bar and controlling said latch, and means for manually moving said unit on said bar and controlling said latch.

22. In combination, interconnected slow and fast speed clutches, a shiftable unit through which said clutches are operated, a shift bar movable relative to said unit, means for automatically moving said bar, opposed springs between which said unit is interposed and through which said bar shifts said unit, latch means controlled by said shift bar for preventing movement of said unit until one of said springs is loaded, a manual control rod connected to said unit, and means movable with said rod for disengaging said latch.

23. In combination, interconnected slow and fast speed clutches, a shift bar, means for automatically shifting said bar, a unit slidably mounted on said bar and connected to said clutches, thrust blocks fixed to said shift bar, springs between said blocks and between which said unit is interposed, thrust collars interposed between the respective ends of said unit and springs, tie rods slidably connecting the thrust collars to the respective thrust blocks, a latch plunger for latching said unit against movement with said bar until one of said springs is loaded, a pin on said plunger, a cam bar operated by said shift bar and cooperating with said pin to release said latch, a manual control bar connected to said unit, and a cam plate on said bar for controlling said latch.

24. In a machine of the character described, a rotary work spindle, a tool slide mounted to each side of and in parallelism with said spindle for longitudinal sliding and rocking movements, a tool arm on each slide, a cam shaft associated with each slide, a cam on each cam shaft for longitudinally moving the associated slide, a second cam on each shaft for rocking the associated slide to move the tool carried thereby into approximate radial cutting position, a third cam on each shaft for controlling the radial position of the associated slide during the cutting operation, a connection between each of said second mentioned cams and its associated slide, a connection between each of said third mentioned cams and its associated slide, a cam on one of said shafts for controlling the speed of rotation of said shafts, and a cam on the other of said shafts for controlling said spindle.

25. In a machine of the character described, a work spindle, a tool slide supported in parallelism with said work spindle for longitudinal sliding and rocking movements, a tool arm on said slide, a cam for longitudinally moving said slide, a cam for rocking said slide to move the tool towards and away from cutting position, a cam for controlling the angular position of said slide and tool during the cutting operation, said second and last mentioned cams being relatively positioned longitudinally of said slide, and means on said slide adapted to successively cooperate with said cams.

GEORGE O. GRIDLEY.